US005247159A

United States Patent [19]

Yuge et al.

[11] Patent Number: 5,247,159

[45] Date of Patent: Sep. 21, 1993

[54] BILL DEPOSITING/WITHDRAWING SYSTEM OF THE CIRCULATION TYPE

[75] Inventors: Akio Yuge, Yokohama; Hajime Watanabe, Tokyo, both of Japan

[73] Assignee: Kabushiki Kaisha Toshiba, Kawasaki, Japan

[21] Appl. No.: 795,889

[22] Filed: Nov. 22, 1991

[30] Foreign Application Priority Data

Nov. 22, 1990 [JP] Japan .............................. 2-320491
Nov. 29, 1990 [JP] Japan .............................. 2-332985

[51] Int. Cl.[5] .............................. G06F 15/30

[52] U.S. Cl. .............................. 235/379; 902/12; 209/534

[58] Field of Search .............................. 235/379; 902/12; 209/534

[56] References Cited

U.S. PATENT DOCUMENTS

| | | | |
|---|---|---|---|
| 4,533,824 | 8/1985 | Watanabe | 235/379 |
| 4,542,287 | 9/1985 | Watanabe | 235/379 |
| 4,571,489 | 2/1986 | Watanabe | 235/379 |
| 4,587,408 | 5/1986 | Watanabe | 235/379 |
| 4,690,268 | 9/1987 | Ueshin | 209/534 X |
| 4,739,156 | 4/1988 | Watanabe | 235/379 |
| 4,825,378 | 4/1989 | Yuge | 209/534 X |
| 4,980,543 | 12/1990 | Hara et al. | 235/379 |
| 5,021,639 | 6/1991 | Hara et al. | 235/379 |
| 5,076,441 | 12/1991 | Gerlier | 209/534 |
| 5,186,334 | 2/1993 | Fukudome et al. | 209/534 |

*Primary Examiner*—Edward P. Westin
*Assistant Examiner*—John R. Lee
*Attorney, Agent, or Firm*—Cushman, Darby & Cushman

[57] ABSTRACT

A bill depositing and withdrawing system of the circulation type for receiving bills deposited and withdrawing them as money to be paid, comprising safe section for storing bills deposited, memory for memorizing the number of the bills stored in the safe section, take-out device for taking out the bills which are to be paid one by one from the safe section first check section for finding whether or not the bills taken out by the take-out are correct, withdrawal section for withdrawing the bills which have been found correct, collector section for collecting the bills which have been found incorrect, instructor for instructing a confirmation operation of the number of bills stored in the safe section, returning passage for returning the bills which have been take out from the save section to the safe section when the confirmation operation instruction is issued by the instructor, first counter for counting the number of the bills which have been returned to the safe section through the returning passage on the basis of results found by the first check section when said confirmation operation instruction is issued by the instructor, and computer for calculating the number of the bills which have been collected by the collector section by substracting the number of the bills counted by the first counter from the number of the bills stored in the memory.

11 Claims, 10 Drawing Sheets

| | | | CONTENTS OF BANK NOTES IN THE STORING SAFES |
|---|---|---|---|
| CONTENTS OF BANK NOTES IN THE MACHINE | BANK NOTES DEPOSITING/ WITHDRAWING SECTION | 10,000 YEN | ( ) |
| | | 5,000 YEN | ( ) |
| | | 1,000 YEN | ( ) |
| | | 500 YEN | ( ) |
| | BUNDLING SECTION | 10,000 YEN | |
| | | 5,000 YEN | |
| | | 500 YEN | |
| | REJECTED BANK NOTES SAFE | | |
| | | | |
| | | | |
| CONTENTS OF BANK NOTES PREPARED FOR THE MACHINE | 10,000 YEN | | |
| | 5,000 YEN | | |
| | 1,000 YEN | | |
| | 500 YEN | | |

F I G. 4

BILL DEPOSITING/WITHDRAWING SYSTEM OF THE CIRCULATION TYPE

BACKGROUND OF THE INVENTION

1. Field of the Invention

The present invention relates to a bill depositing and withdrawing system of the circulation type installed at the machine corner of banks, for example, to automatically enable bills to be deposited and drawn or paid.

2. Description of the Related Art

Financial agencies such as banks are now shifting their business facilities to the cash management system of the circulation type because of high business efficiency. The bills depositing and drawing system of the circulation type enables amounts of money deposited and paid to be managed. Therefore, the amount of bills in the bill depositing and drawing system (which will be hereinafter referred to as contents of bills in the machine) can be correctly confirmed every kind of money, but when any of bills in the machine are rejected at the time of cash payment, the amount of bills prepared as paying cash in each of storing safes (which will be hereinafter referred to as contents of bills in the storing safes) can be only confirmed as an approximate value according to every kind of money.

After the cash depositing and paying business is finished in the bank, therefore, it is needed that bill in each of the storing safes in the machine must be carefully examined to correctly know contents of bill in the storing safes. At the same time, the amount of bills in a safe in which bills rejected at the time of cash payment are stored (which will be hereinafter referred to as contents of bills in the rejected bills safe) is confirmed every kind of bill and it is also confirmed whether or not the total of these amounts of the bills in the storing safes and in the rejected bills safe equals to the amount of the bills in the machine.

In the case of the conventional bill depositing and withdrawing apparatus of the circulation type, however, contents of bills in the rejected bills safe ar calculated after their careful examination and added to the amount of bills prepared outside the machine (which will be hereinafter referred to as contents of bills prepared ready for the machine) according to every kind of money. When the number of bills rejected and stored in the rejected bills safe at the time of cash payment becomes large, therefore, it is needed that bills are newly added from contents of bills prepared outside the machine to the storing safes in the machine. This adding of bills to the storing safes in the machine needs complicated processes, thereby increasing the amount of works which the bank employee (operator) in charge must do in addition to his routine work.

SUMMARY OF THE INVENTION

An object of the present invention is therefore to provide a bill depositing and withdrawing system of the circulation type capable of making it unnecessary to confirm contents of bills in the storing safes in the machine after the cash depositing and paying business is finished.

Another object of the present invention is to provide a bill depositing and withdrawing system of the circulation type capable of making shorter the time needed to carefully examine the amount of bills in each of the storing safes in the machine, reducing the possibility of damaging bills in the machine, making the machine smaller-sized because not auxiliary safe is needed, and confirming contents of bills in the storing safes and the number of bills stored in the rejected bill safe even when any of bills are rejected at the time of cash payment because of abnormal cash paying operation of the machine.

According to an aspect of the present invention, a bill depositing and withdrawing system of the circulation type for receiving bills deposited and withdrawing them as money to be paid comprises: storing means for storing bills deposited; memory means for memorizing number of the bills stored in the storing means; take-out means for taking out the bills which are to be paid one by one from said storing means; detecting means for detecting whether or not the bills taken out by the take-out means are correct; withdrawal means for withdrawing the bills which have been found correct by the detecting means; collector means for collecting the bills which have been found incorrect by the detecting means; causing means for causing a confirming operation for confirmation of the number of bills stored in the storing means; returning means for returning the bills which have been taken out from the storing means by the take-out means and detected correct by the detecting means to the storing means during the confirmation operation caused by the causing means; first counting means for counting the number of the bills which have been returned to the storing means by the returning means on the basis of results by the detecting means during the confirming operation caused by the causing means; and calculating means for calculating number of the bills which have been collected by the collector means by substracting the number of the bills counted by the first counting means from the number of the bills stored in the memory means.

According to the system of the present invention, contents of bills in the storing safes in the machine become unclear at the instant when any of the bills are rejected and stored in the rejected bills safe at the time of cash payment because of malfunction of the machine, but the number of bills in each of the storing safes in the machine can be carefully examined according to every kind of money by the carefully examining means when the cash payment operation is not carried out, so that contents of bills in the storing safes in the machine can be made clear or confirmed. When the amount of bills present in the machine is substrated by the amount of bills stored in the storing safes according to every kind of money, the amount of bills rejected and stored in the rejected bills safe can be obtained.

It is preferable in this case that a carriage means is provided to carry bills in the machine to outside the machine. Bills stored in the rejected bills safe can be taken out from the machine by the carriage means and they can be managed as a part of contents of bills prepared outside the machine.

Further, it is preferable to provide a cash depositing means related to the cash depositing section. When bills stored in the rejected bills safe are moved into the storing safes through the bill depositing section by the cash depositing means, they can be again managed as a part of contents of bills in the storing safes in the machine. When another carriage means is provided in this case, bills rejected when cash is being deposited by the cash depositing means can be picked up outside the machine by this another carriage means and managed as a part of contents of bills prepared outside the machine.

According to another aspect of the present invention, a bill depositing and withdrawing system of the circulation type for receiving bills deposited and withdrawing them as money to be paid, comprising: storing means for storing bills deposited; means for causing a confirming operation for confirming of the number of the bills stored in the storing means; card supplying means for supplying a separator card to the storing means when said confirming operation is caused by the causing means; memory means for memorizing the number of the bills stored in the storing means; take-out means for taking out the bills to be paid and separator cards one by one from the storing means; counting means for counting number of the bills taken out by the take-out means; returning means for returning the bills counted by the counter means to the storing means; detector means for detecting the operator card taken out by the take-out means; and stopping means for stopping the operation of said take-out means, said counter means and said returning means when the separator card is detected by said detector means.

According to the another aspect of the present invention, a bill depositing and withdrawing system of the circulation type for receiving bills deposited and withdrawing them as money to be paid, comprising: storing means for storing bills deposited; card supplying means for supplying a separator card to the storing means at a predetermined time of the depositions thereafter, said separator card separating the bills and intervening in said bills memory means for memorizing, by the unit, the number of bills separated by said separator card in said storing means; take-out means for taking out the bills to be withdrawed and said separator card one by one from the storing means; withdrawal means for withdrawing the bills be taken out by the take-out means; causing means for causing a confirming operation for confirmation of the number of bills stored in the storing means; counter means for counting number of the bills be taken out by the take-out means during the confirming operation caused by the causing means; returning means for returning the bills counted by the counter means to the storing means; detector means for detecting the separator card be taken out by the take-out means; stopping means for stopping said take-out means, said counter means and said returning means when the separator cars is detected by the detector means; and calculating means for calculating a certain number of bills stored in the storing means on the basis of the number of the bills counted by the counter means and a certain number of bills separated by the separator card detected by the detector means stored in the memory means.

According to the system of the present invention, the separator cards are supplied to the temporarily accumulating sections when the careful examination is started, and bills in the storing safes are then calculated while taking out them in the storing safes and accumulating them in the temporarily accumulating section, and this take-out of them is continued until the temporarily accumulating sections are filled with them or the storing safes are made empty. The storing means is again driven to cause the bills in the temporarily accumulating sections to be stored in the storing safes and to take out the bills out of the accumulating safes and again return them in the temporarily accumulating sections. When this process is repeated, contents of bills in the storing safes can be confirmed.

When the number of bills taken from the bill supply section into the machine becomes larger than a certain value or this take-in of bills into the machine is finished, the separator cards are stored in the storing safes while being supplied to the temporarily accumulating sections. The number of bills sandwiched between the separator cards is stored in the memory means. Bills are taken out of each of the storing safes at the time of the careful examination until the separator cards are detected, and the bills thus took out are stored in their corresponding storing safe while being counted, so that contents of bills in their corresponding storing safe can be confirmed. Contents of bills in each of the other storing safes can be similarly confirmed and when bills remaining in one of the temporarily accumulating sections ar finally stored in their corresponding storing safe, the careful examination is finished.

On the other hand, contents of bills in the storing safes become unclear at the instant when any of bills are rejected and stored in the rejected bills safe at the time of cash payment because of malfunction of the machine, but the number of bills in each of the storing safes can be carefully examined every kind of money, using the careful examining means and the memory means in which the number of bills between the separator cards is stored, when the cash payment operation is not carried out, so that contents of bills in the storing safes can be confirmed. When the contents of bills in the storing safes are re-newed every time when the separator card is detected, contents of bills in the storing safes are those in the rejected bills safe can be confirmed. Even when the cash payment operation becomes abnormal therefore, the contents of bills present in the machine can be confirmed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is an image view showing contents of bills stored in the memory section of the teller machine;

DETAILED DESCRIPTION OF THE PREFERRED EMBODIMENTS

Some embodiments of the present invention will be described with reference to the accompanying drawings.

Figure 1:
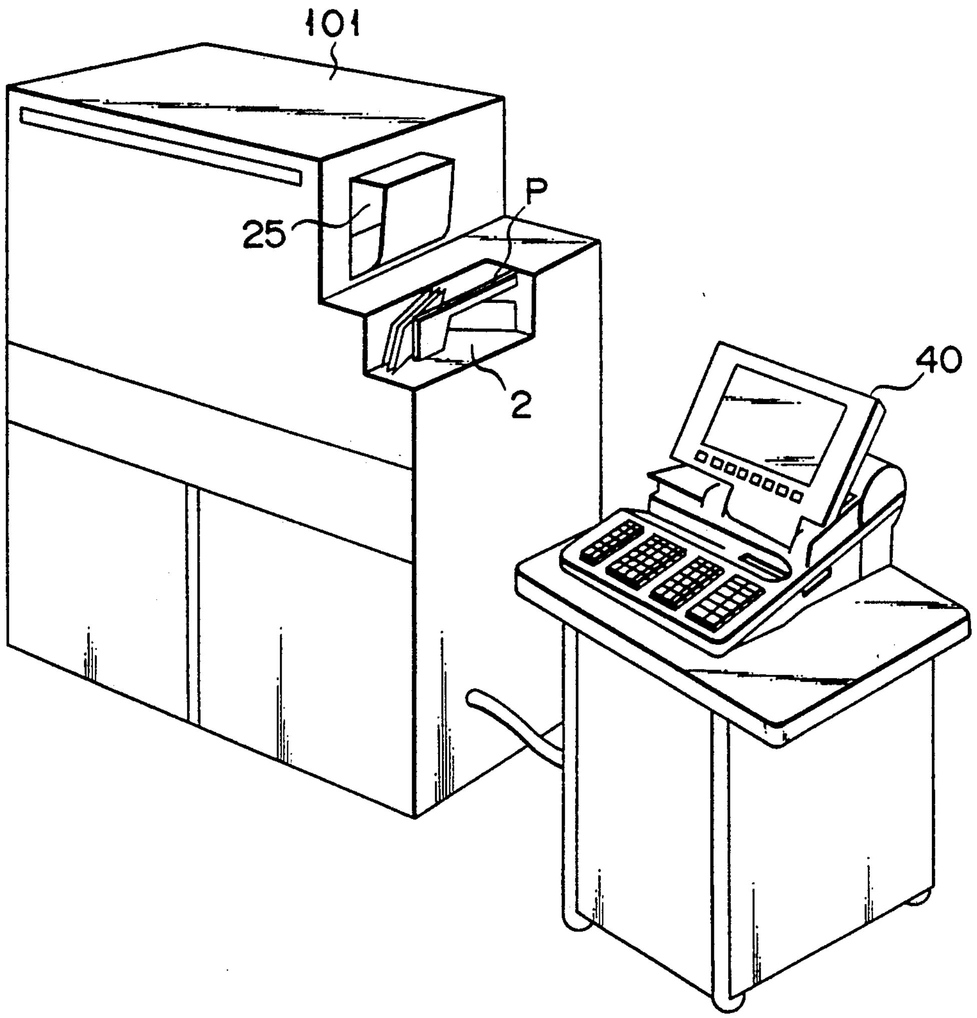
FIG. 1 is a perspective view showing the appearance of a bill depositing/drawing system of the circulation type.

FIG. 1 shows an entire system of the present invention, which can be divided into bill handling equipment 101 including a bill bundler, and a teller machine 40. The teller machine 40 includes a control board, a CRT display unit and a printer. The bundler including bill handing equipment 101 includes a bill bundler unit (not shown), a bill bundler outlet (not shown), a bill supplying portion 2 and a rejected bill stacker 25. Such the bill handling equipment is described in U.S. Pat. No. 4,825,378.

Figure 2:
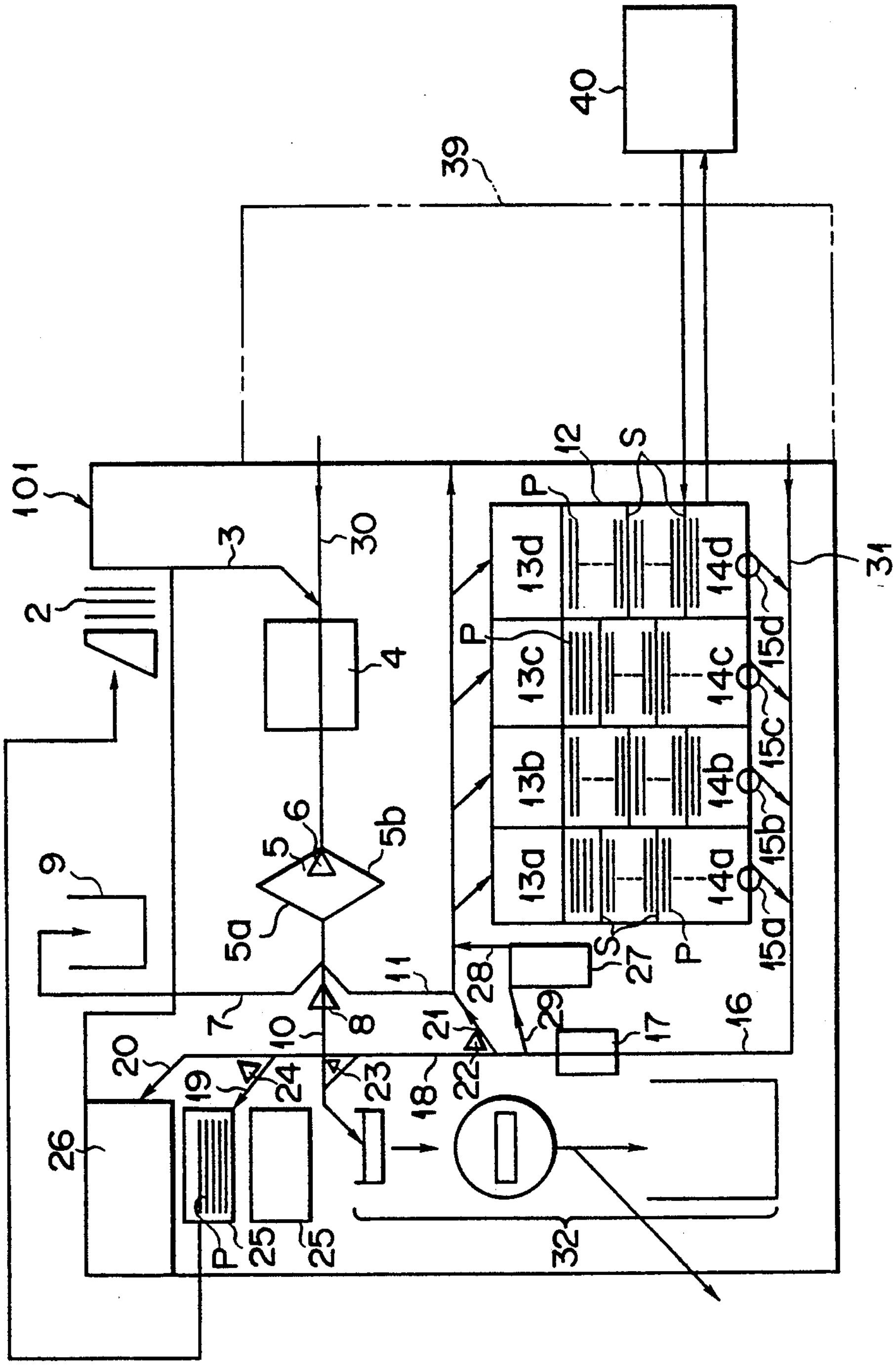
FIG. 2 is a system block view showing the bill depositing/drawing system of the circulation type according to an embodiment of the present invention.

FIG. 2 is a system block view schematically showing the bill depositing/drawing system of the circulation type according to an embodiment of the present invention. The bills depositing opening 2 is formed on the top of the bills depositing/drawing apparatus or machine 101 and bills P inserted as a unit into the opening 2 are taken one by one into the machine. Bills P stored in the machine are paid or drawn outside of the machine through a bills drawing opening 26 also formed on the top of the machine 101.

A passage 3 for carrying bills inserted extends from the bills depositing opening 2 into the machine 101. This passage 3 passes through a first check section 4 and the bills P taken into the machine 101 through the opening 2 are checked at first at this first check section 4, which serves to find kinds of the bills P, whether or not they are false, whether or not they are damaged, and whether or not they are laid upside down.

An inverting section 5 is located downstream the first check section 4 to lay all of the bills P upside up while they are being carried. Namely, those of the bills P which are found "laid upside up or front-sided" at the first check section 4 are carried to a front-sided bills carrying section 5*a* by a gate device 6 at the inverting section 5 and the others which are found "laid upside down or back-sided" at the first check section 4 are carried to a back-sided bills carrying section 5*b*. Detailed description on this system for laying all of bills upside up or upside down will be omitted but more information will be obtained from U.S. Pat. No. 4,690,268.

Another gate device 8 is located downstream the inverting section 5. This gate device 8 serves to find kinds of the bills P, whether or not they are false and whether or not they are damaged. When those of the bills P which have been front-sided are found not to be discriminated by the gate device 8, they are rejected and sent to a rejected bills safe 9 through a passage 7, but the other which are discriminated by the gate device 8 are carried to a safe section 12 through a passage 11. If specified, only those of the bills P which belong to that specified kind of money can be carried to a bills half-wrapping or bundling section 32 through a passage 10. These bills P are bundled at the bills bundling section 32 and then stored in a bundled bills case or picked up out of the machine 101.

The cash depositing/drawing machine 101 provided with the bills bundling system also has a pair of passages 30 and 31 lead outside the machine 101. The cash depositing/drawing machine 101 can be connected to an external apparatus 39 through these passages 30 and 31 to increase the number of line along which bank notes to be deposited and paid are carried.

The safe section 12 is partitioned into four chambers and 10,000 yen, 5,000 yen, 1,000 yen and 500 yen bills are carried to their corresponding chambers. Bills temporarily accumulating sections 13*a*-13*d* are located upstream the chambers and storing safes 14*a*-14*d* are located downstream the chambers. A teller machine 40 is connected to the safes 14*a*-14*d*. The bills P which are temporarily accumulated at the sections 13*a*-13*d* are stored in the safes 14*a*-14*d*, responsive to commands applied from the teller machine 40.

Take-out devices 15*a*-15*d* are located at bottoms of the safes 14*a*-14*d* to pick up the bills P one by one onto a passage 16.

A second check section 17 is located downstream the passage 16. This second check section 17 serves to find which kinds the bills P belong to. A passage 18 located downstream the second check section 17 has three gate devices 22, 23 and 24.

The first gate device 22 is located at that position of the passage 18 from which a return passage 21 branches. The return passage 21 is combined with the passage 11 (located upstream the safe section 12) and the bills P which have been distributed by the first gate device 22 flow on the return passage 21. When no cash drawing operation is carried out, the first gate device 22 is switched to the passage 21 to circulate the bills P between the safe section 12 and the second check section 17, so that the bills P in the storing safes 14*a*-14*d* can be carefully examined.

The second gate device 23 is located downstream the first one 22 and it serves to change the flow of the bills P from the passage 18 to the bills bundling section 32.

A separator card supply device 27 is provided between the second check section 17 and the safe section 12, to supply a separator card S to the safe section 12 through a passage 28, and to collect the system 27 it through passage 29. The separator card S serves to divide a plurality of bills P, which are temporarily stored in each of the safes 14*a*-14*d*, into a predetermined number of them and check their number in each of the safes 14*a*-14*d*.

The third gate device 24 is located downstream the second one 23 and it serves to change the flow of bills from a bills drawing passage 20 to a rejected bills passage 19. When a bills P which pass through the second check section 17 is abnormal, that is, plural sheets of bills P are carried at same time, for example, these bills are sent to a withdrawed rejected bills safe 25 through the passage 19. The rejected bills in the rejected bills safe 25 are collected by a collecting means (not shown) located outside the machine 101 and they can be again deposited into the machine 101 through the depositing section 2, or an operator can be managed as bills outside the machine 101. Plural rejected bills safes 25 are prepared to be exchanged with the one now used.

Figure 3:
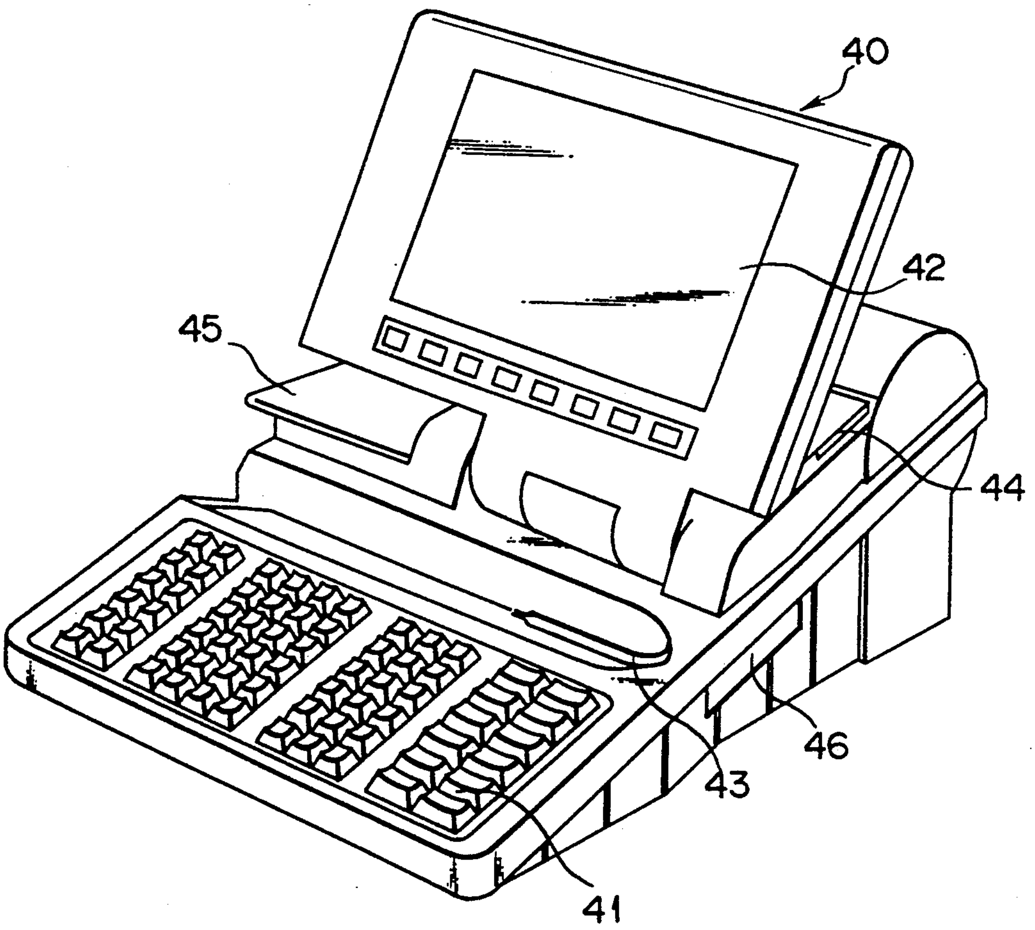
FIG. 3 is a perspective view showing the automatic teller machine.

As shown in FIG. 3, the teller machine 40 includes a keyboard section 41, a display 42, a card reader section 43, a journal printer section 44, a slip printer section 45 and an FDD device 46. The key board section 41 is used to input information and value needed to manage money deposited and withdrawed. The display 42 serves to display values inputted and results calculated. The card reader section 43 is intended to read the magnetic card. The journal printer section 44 prints transaction results. The FDD device 46 is intended to read programs and the like.

As shown in FIG. 3, number and amount of bills in the machine 101 and prepared ready for the machine 101 are stored every kind of money in the memory section of the teller machine 40. Further, contents of bills in the machine 101 are divided into those in the bills depositing/drawing section and those in the bills bundling section and contents of bills in the bills depositing/drawing section are stored in the teller machine 40, including those in the storing safes as well. When the teller machine 40 is used, therefore, the number of bills P in the machine 101 can be controlled and bills P prepared ready for the machine 101 can also be controlled as operator's bank. Those of bills P which are rejected at the time of deposition but registered by manual input, for example, can be controlled as bills prepared ready for the machine 101.

It will be explained, with reference to FIGS. 5A to 5F, how bills depositing/drawing business is carried out (or the flow of bills P is made) by the above-described bill depositing/drawing system of the circulation type.

Figure 5A:
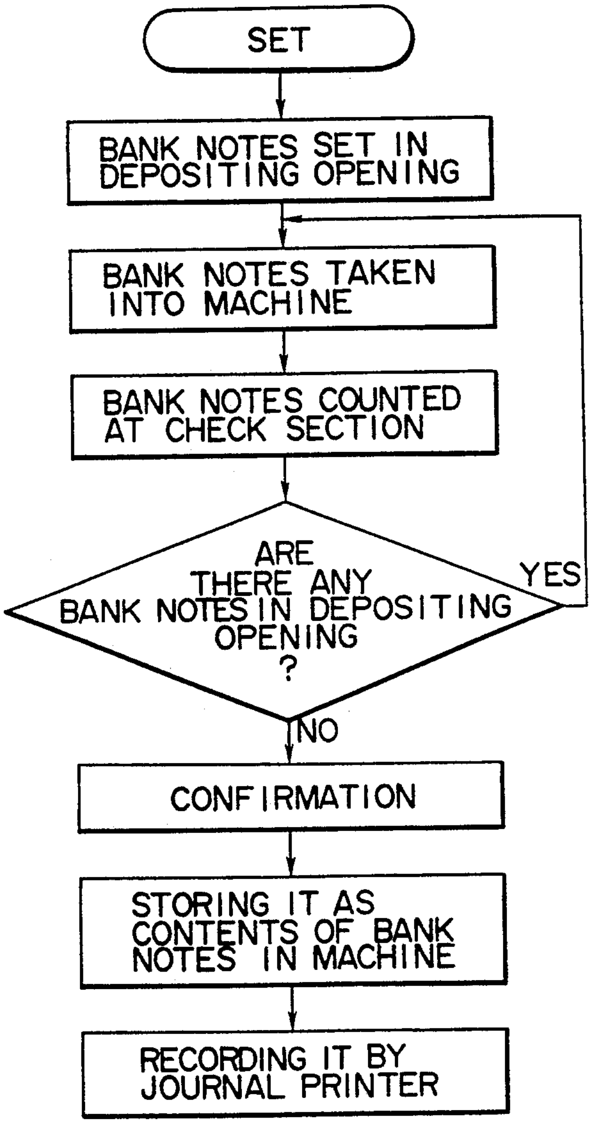
FIGS. 5A to 5F are flow charts intended to explain, how contents of bills are managed, respectively.

FIG. 5A is a flow chart intended to explain, how bills are set in the machine.

Bills P to be drawn or paid are set in each of the storing safes 14*a*–14*d* before the business is started. A bills setting mode is selected by the teller machine 40 and bills P are set at the bills depositing opening 2. When command to start bills setting is inputted by the teller machine 40, the bills P at the bills depositing opening 2 are taken one by one into the machine 101. It is found by the first check section 4 what kinds of money they belong to and whether they are laid upside down or upside up, and they are accumulated in the bills temporarily accumulating sections 13*a*–13*d*, as asked, following the results found. When no bill P is found at the bills depositing opening 2, amounts of money calculated at the first check section 4 are displayed every kind of money on the display of the teller machine 40 and when the confirmation button is pushed, the bills P move from the temporarily accumulating sections 13*a*–13*d* to the storing safes 14*a*–14*d*. The bills P which equal to calculated amount of money are shifted in the memory of the teller machine 40 from those prepared ready for the machine 101 to contents of bills in the machine 101. The setting of bills P in the storing safes 14*a*–14*d* in the machine 101 is thus ended after the above process. The result of this bills setting in the machine 101 is recorded and printed out by the journal printer 44.

Figure 5D:
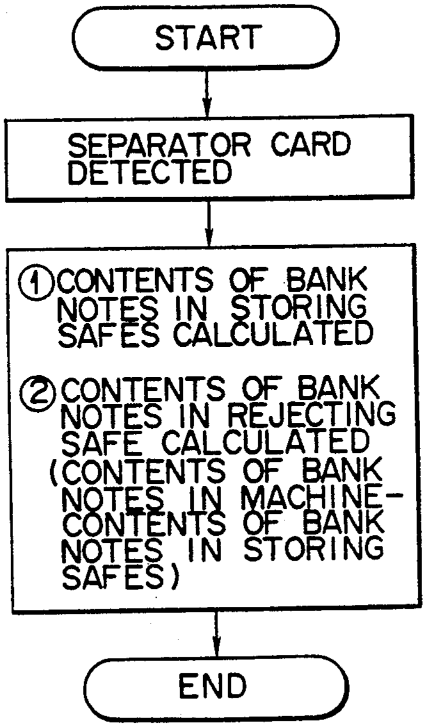
Figure 5B:
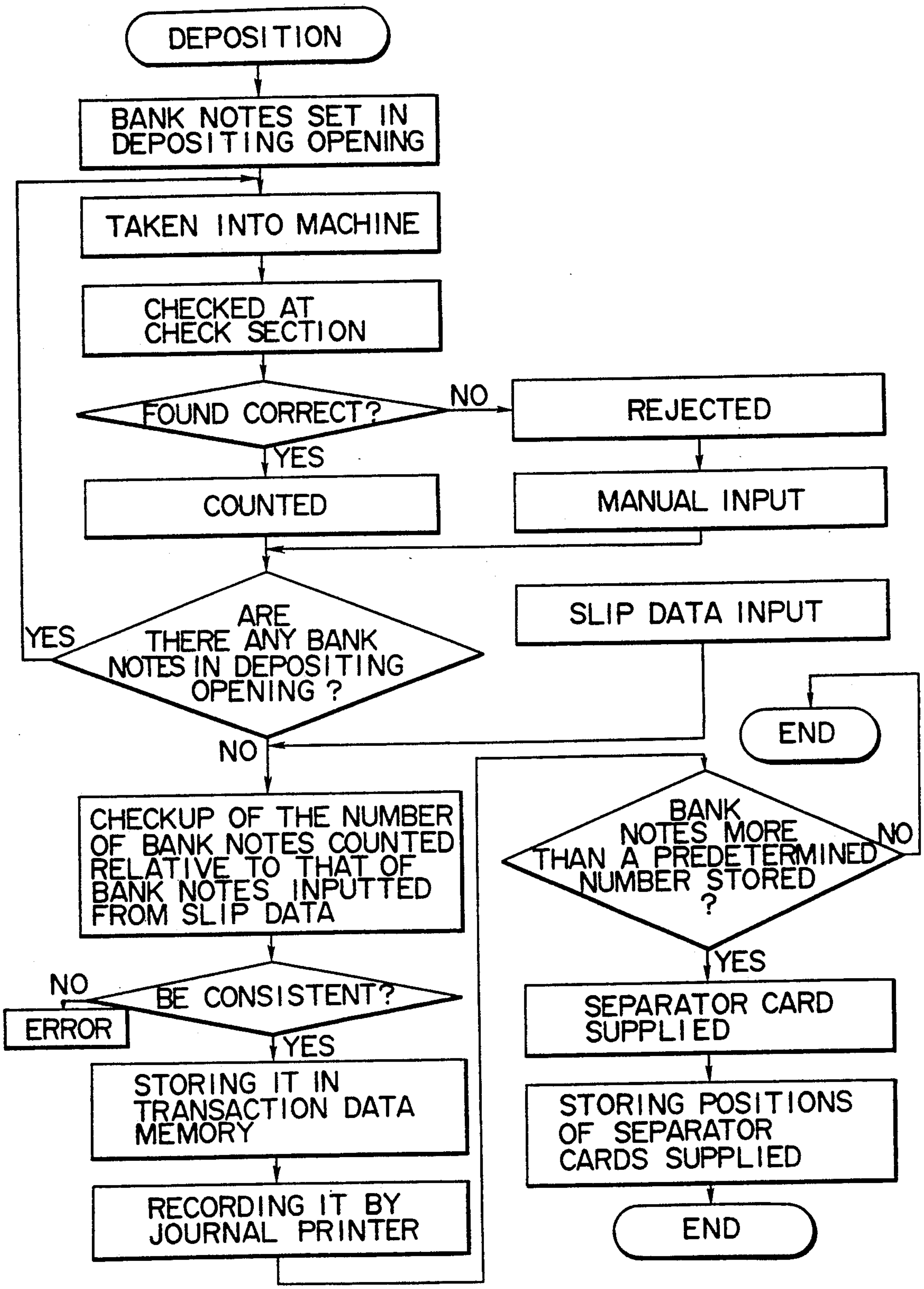

FIG. 5B is a flow chart intended to explain, how bills are deposited in the machine.

When bills are to be deposited by the machine 101, bills P to be deposited are set at the opening 2 and calculation start is asked by the teller machine 40. While the bills P are being calculated by the machine 101, slip data including the amount of money, account number and the like can be inputted through the teller machine 40. In addition, those bills P which are rejected because they cannot be discriminated can also be manual-inputted. When data on the slip equal to values calculated, the bills P accumulated in the temporarily accumulating sections 13*a*–13*d* are moved to the storing safes 14*a*–14*d* and this transaction is finished.

10,000 yen bills are stored in the storing safe 14*a*, 5,000 yen bills in the storing safe 14*b*, 1,000 yen bills in the storing safe 14*c* and 500 yen and damaged bills in the storing safe 14*d*. If the amount of money on the slip is not equal to the value calculated by the machine 101, the bills P can be returned through a temporarily-returning door (not shown), or they can be stored in the storing safes 14*a*–14*d* while leaving these values unequal. When they are stored leaving the values unequal, however, this data is naturally stored in the transaction data memory of the teller machine 40, and is recorded printed out by the journal printer 44.

When a transaction is finished and it is confirmed that the number of bills P stored in each of the storing safes 14*a*–14*d* has become larger than a predetermined value since cards supply is made at the previous transaction, separator cards S are supplied from the card supply device 27 to each of the temporarily accumulating sections 13*a*–13*d* through the passage 28. These separator cards S are stored together with bills P in the storing safes 14*a*–14*d*. It is stored in a bill memory section (not shown) in each of the storing safes what-numbered sheet of the bills the card S is laid on, that is, the address of the card S is stored in the bill memory section. The cards S are shaped substantially like a bill, but they can be discriminated by the second check section 17 and picked up, like the bills P, out of the machine 101.

When the number of bills P in the storing safes 14*a*–14*d* are smaller than a predetermined number of bills to be stored, after outputting the record by the journal printer, the deposition is immediately ends without supplying the separator card S to the storing safes 14*a*–14*d*.

When the above cash depositing operation is repeated, each of the storing safes is nearly filled with bills. When it is detected that the storing safe 14*a* for example, is filled with bills, the bills P in the storing safe 14*a* are automatically picked up by the device 15*a*, it is confirmed by the second check section 17 what kinds of money they belong to, and they are then sent to the bills bundling section 32 through the passages 18 and 11. The bills P thus sent are bundled every one hundred sheets of them and stored.

When the number of the bills left in the storing safe 14*a* becomes smaller than the predetermined value and the supply of bills is finished not to leave any odd bill in the bundling section 32, the operation of the device 15*a* to pick up bills out of the storing safe 14*a* is stopped. The separator card S also picked up out of the storing safe 14*a* is discriminated by the second check section 17 and returned to the card supply device 27 through the passage 29.

Figure 5C:
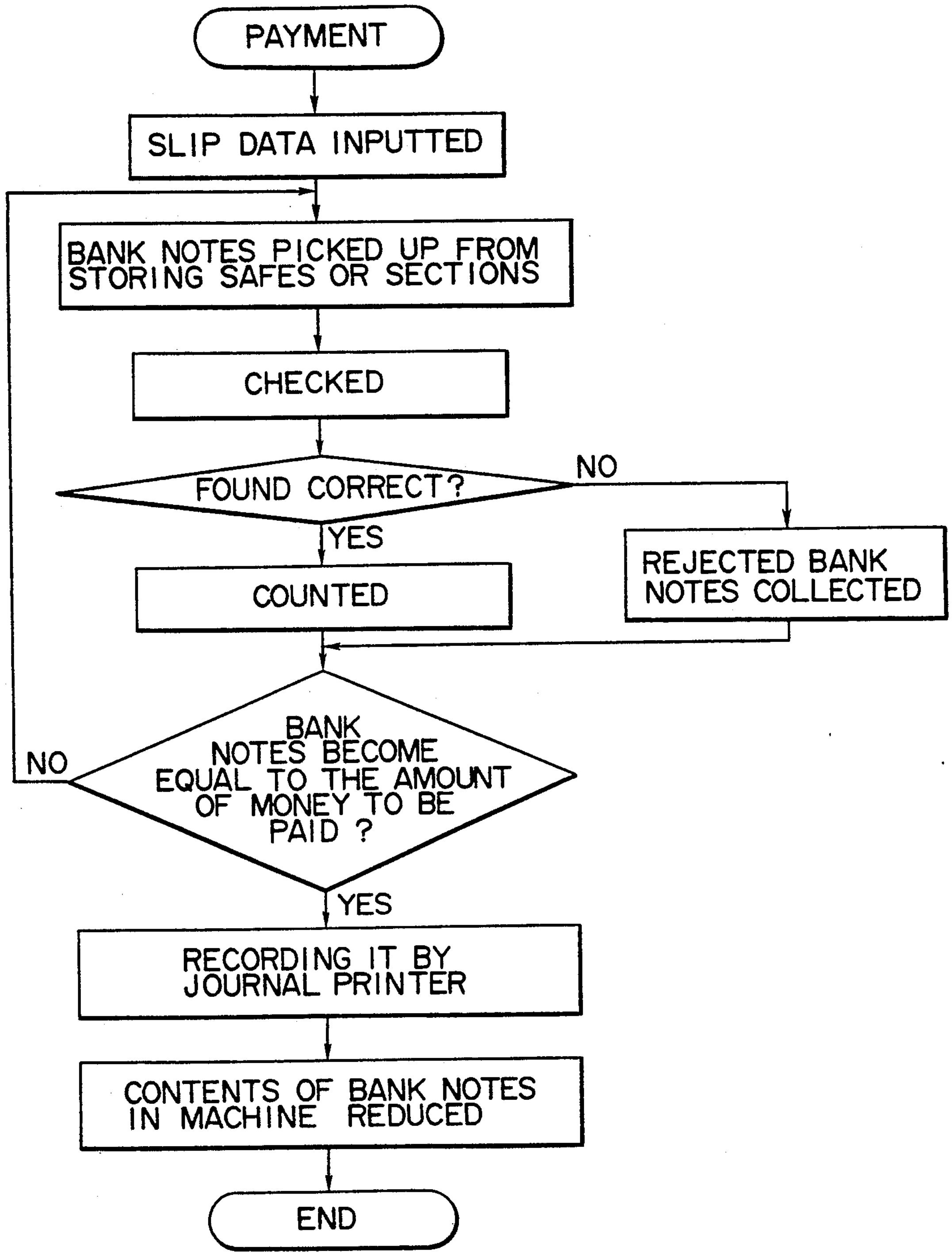

FIG. 5C is a flow chart intended to explain, how bills are withdrawn from the machine.

When bills P are withdrawn by the machine 101, slip data relating to the amount of money to be paid, the account number and the like are inputted and it is asked to start the cash drawing operation through the teller machine 40. Bills P which equal to the amount of money to be paid are taken out of the storing safes 14*a*–14*d*, discriminated by the second check section 17 and then carried to the cash drawing opening 26 through the passage 20. When all of those bills which are designated through the teller machine 40 are taken out of the storing safes, they are made ready to be taken out of the machine 101 through the cash drawing opening 26. The cash withdrawing operation is thus ended. The record of this withdrawing transaction is printed by the journal printer 44 of the teller machine 40, contents of bills in the machine 101 are substrated by the amount of money paid and a value representing new contents of bills in the machine 101 is registered in the memory. Those bills P which are found not discriminated by the second check section 17 are sent to the rejected bills safe 25 through the passage 19. When the separator card S is taken out the storing safe 12, it is returned to the card supply means 27 through the passage 29.

FIG. 5D is a flow chart intended to explain, how contents of bills are clear while operating for payment.

Because the bills P are sometimes rejected as described above during the cash withdrawing operation, contents of bills in the machine 101 which are stored in the teller machine 40 are a sum of the bills in the storing safes **14*a*–14*d* and of those in the rejected bills safe 25. As long as the correct number of bills in the rejected bills safe 25 is not clear, therefore, it cannot be avoided that contents of bills in the storing safes 14*a*–14*d* are represented by a rough number of bills. When the separator card S is taken out of the storing safe 14*a*, for example, the number of the bills held between one separator card and next separator card is already known. Therefore, the number of bills in the storing and rejected bills safes 14*a* and 25** can be made clear until any of the bills to be paid is next rejected after the card S is taken out.

Figure 5E:
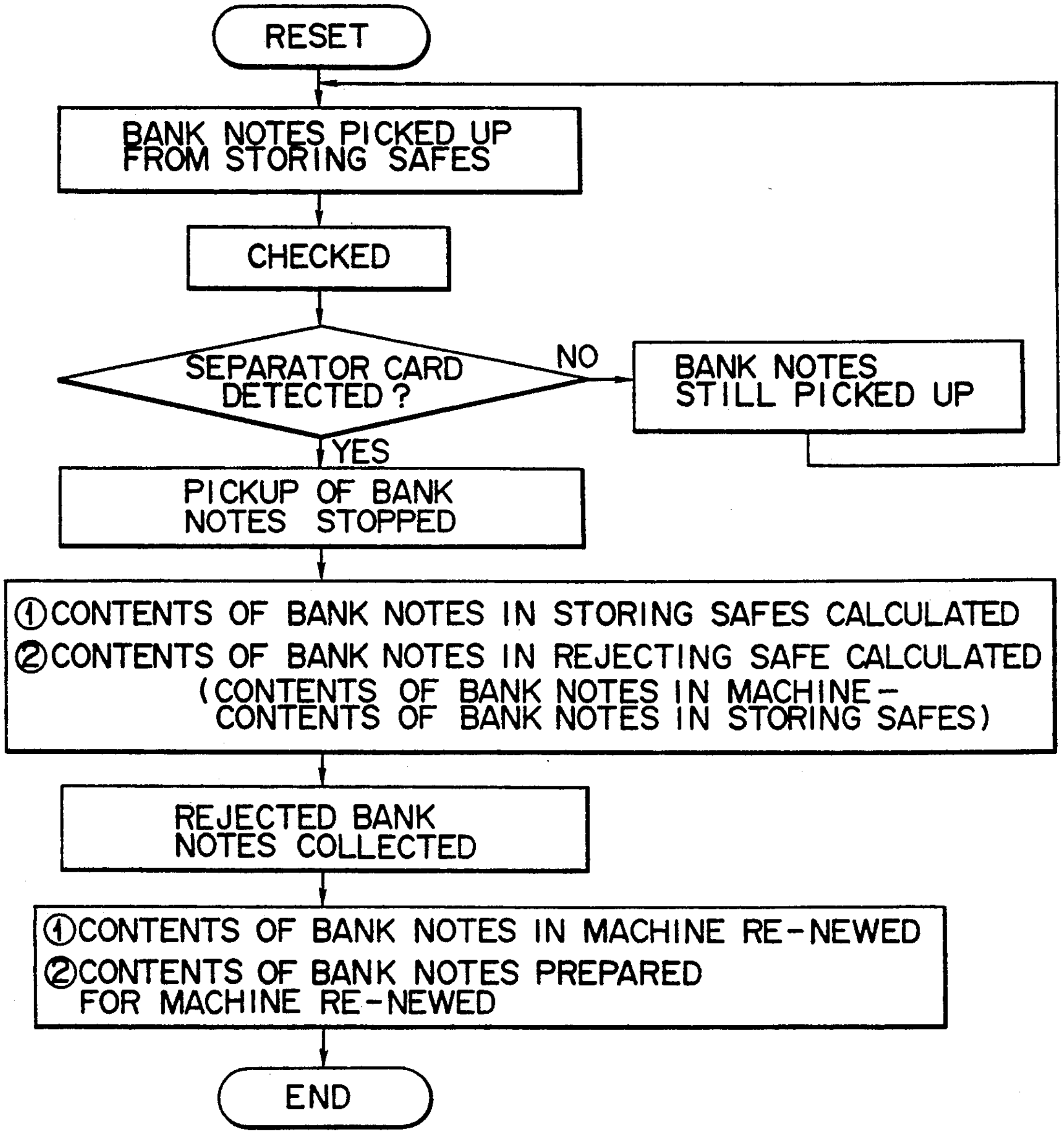

FIG. 5E is a flow chart intended to explain, how bills are re-set in the machine.

When the machine 101 is jammed by any of bills during the cash drawing operation bills remaining on the passages in the machine 101 are removed, re-set command is inputted through the teller machine 40, and bills are taken out of each of the storing safes **14*a*–14*d* until the card S comes out of cash of the storing safes 14*a*–14*d*. Bills thus took out are carried to the cash drawing opening 26** and stored by the operator in charge.

Command asking that the rejected bills safe 25 is exchanged with a new on is issued and the rejected bills safe 25 now used is made empty. The number of bills P stored in each of the storing safes **14*a*–14*d* can be confirmed this time. Therefore, contents of bills in the machine 101 before the transaction can be substrated by those now stored in the storing safes 14*a*–14*d* and the value thus obtained is added to contents of bills prepared ready for the machine 101. The operator in charge may treat bills left, paid and stored in the rejected bills safe as those prepared ready for the machine 101** and carry out the cash drawing operation again.

Therefore, in the case of bills paid are very often rejected, contents of bills in the machine can be accurately renewed.

Figure 5F:
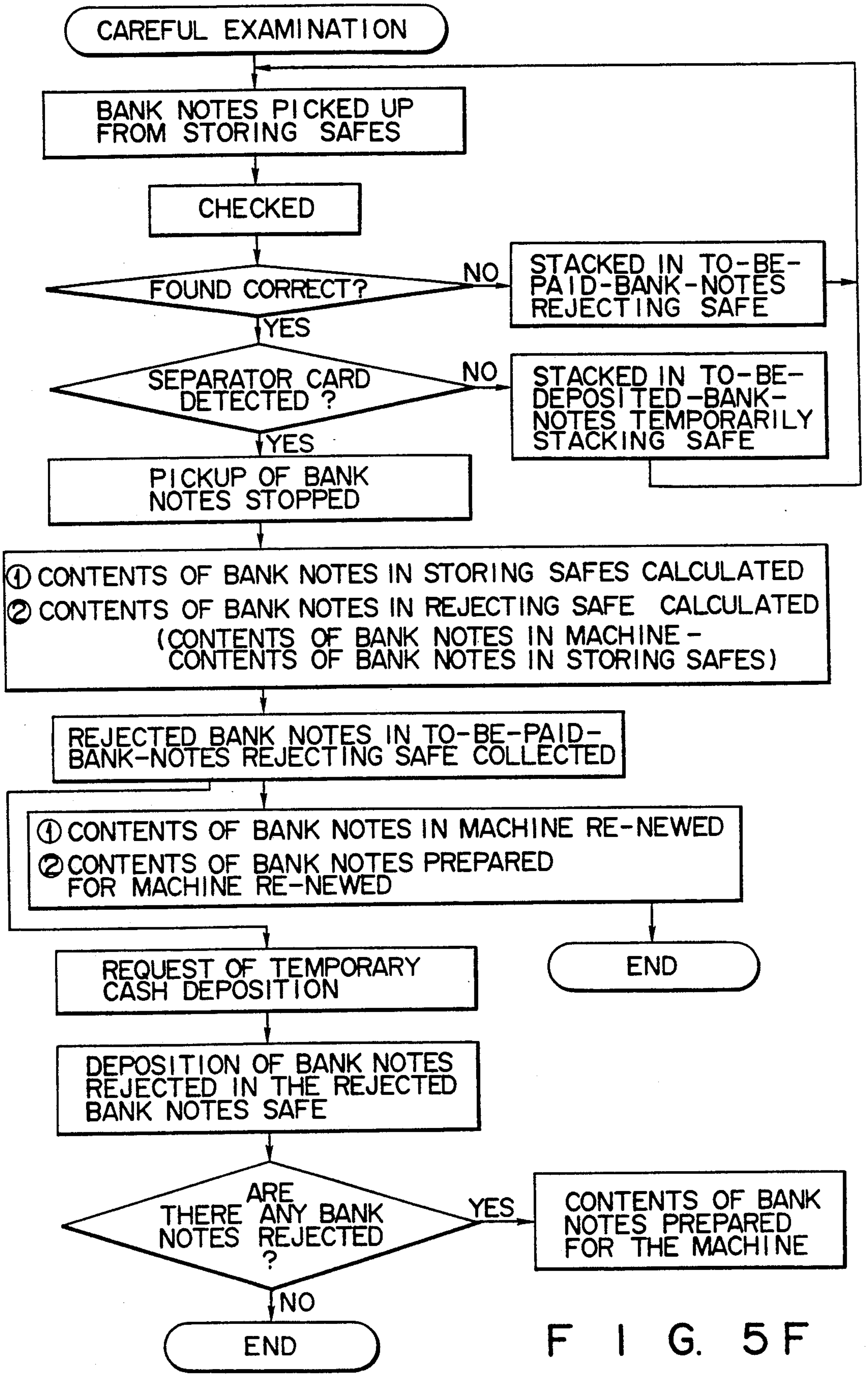

Careful examination after the cash deposit/withdrawal business will be described referring to FIG. 5F. This careful examination means that the number of bills stored in the storing safes **14*a*–14*d* in the machine 101** is confirmed every kind of money.

When the cash depositing and drawing operations are finished relating to the customers, doors for cash depositing and drawing openings 2, 26 are closed. Command for the careful examination is inputted to the safe section 12 through the teller machine 40. Bills P are successively took out from each of the storing safes **14*a*–14*d* until the separator card S comes out of it. The bills thus picked up are successively accumulated in the temporarily accumulating sections d13*a*–13*d* through the passages 16 and 21. Those of the bills which cannot be discriminated by the second check section 17 are rejected into the rejected bills safe 25. When the separator card S is taken out from the storing safe 14*a*, for example, during this careful examination, the number of bills in the storing safe 14*a* can be confirmed at this instant. The careful examination of bills in each of the other storing safes 14*b*–14*d*** is then successively carried out.

When bills P in the rejected bills safe 25 are taken out after the careful examination, their number is printed by the journal printer 44 of the teller machine 40. This number of bills can be obtained by substracting contents of bills in the machine 101 by those in the storing safes. Bills P which are taken out up from the rejected bills safe 25 can be re-set in the storing safe **14*a* through the cash depositing opening 2 when the mode under which the rejected bills are again inserted into the machine 101 is established through the teller machine 40. When any of the bills thus inserted is again rejected in this case, the number of bills rejected is manual-inputted through the teller machine 40 and these bills are treated as those prepared ready for the machine 101. Bills in the rejected bills safe 9 are also treated as those prepared ready for the machine 101**.

When separator cards supply device 27 is not provided, the separator cards S are supplied to each of the storing safes **14*a*–14*d* through the cash depositing opening 2 before the careful examination, and bills in each of the storing safes 14*a*–14*d*** are carefully examined in the same way as described above.

Figure 6:
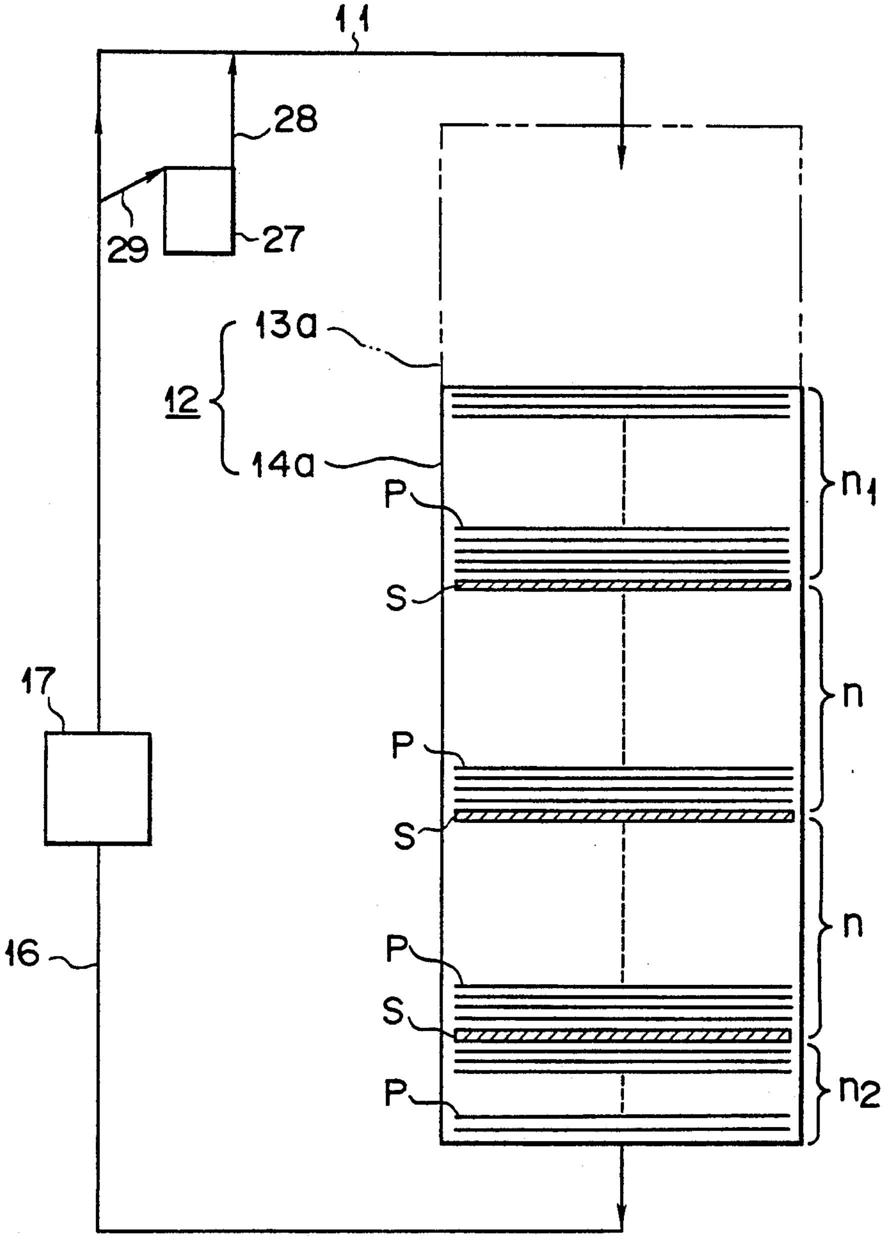
FIG. 6 is a system block diagram showing a part of the storing safes enlarged when the careful examination process is being carried out.

The careful examination about the storing safe **14*a* in which 10,000 yen bills are stored will be described in more detail with reference to FIG. 6**.

Those depositing bills which are found to be 10,000 yen bills by the first check section 4 are accumulated in the 10,000 yen bills temporarily accumulating section **13*a* at the safe section 12 through the passage 11. When a predetermined number of bills are accumulated in the temporarily accumulating section 13*a*, they are moved into the storing safe 14*a*. When the number of depositing bills in the temporarily accumulating section 13*a* becomes equal to a predetermined value n, a sheet of the separator card S is supplied from the separator cards supply means 27 to the temporarily accumulating section 13*a* through the passages 28 and 11. When the number $n_1$ of bills P in the storing safe 14*a* reaches the predetermined value n, the separator card S is dropped from the temporarily accumulating section 13*a* into the storing safe 14*a* and the bills P in the storing safe 14*a* are separated by the separator cards S to have such a number that equals to the predetermined value n. The bills P thus grouped in the storing safe 14*a*** are taken out one by one responsive to the cash drawing operation command.

It is assumed that the number $n_2$ of bills present under the lowermost separator card S in the storing safe **14*a* is not clear because the depositing bills are very often rejected, for example. In order to make clear this number $n_2$ of bills, the number of the bills P present under the lowermost separator card S in the storing safe 14*a* is carefully examined by the second check section 17 after the cash depositing/drawing business is finished. The bills P are passed one by one through the second check section 17 and sent into the temporarily accumulating section 13*a* through the passage 11. This process is continued until the separator card S passes at first through the second check section 17. When the separator card S emerges like this, the number $n_2$ of bills present under the lowermost separator card S in the storing safe 14*a* can be determined at this instant and the number of bills P in the storing safe 14*a*** can also be determined at the same time. Contents of bills in the storing safes are thus made clear, so that contents of drawing bills rejected can be confirmed on the basis of the actual number of bills drawn or paid and the contents of bills in the storing safes.

According to the bill depositing and drawing system of the present invention, it is unnecessary to add new bills from outside to the storing safes in the machine even when bills paid are very often rejected. The careful examination about bills in the storing safes can be automatically carried out by the machine and contents of bills in the machine can be accurately renewed. This makes it unnecessary to do complicated work after the transaction business is finished, thereby helping business activities be greatly improved in banks, for example.

In the case of the conventional bill depositing and drawing system, however, the empty auxiliary safes are provided independently of the bills storing safes, thereby causing the machine to be large-sized as a whole. In addition, bills must be transferred from the bills storing safes to the empty auxiliary ones and then from the auxiliary safes to the bills storing ones. The time needed to carry out the careful examination therefore becomes long. Further, same bill must be treated twice at one operation of careful examination process, thereby causing bills to be fatigued and damaged.

In the case of the conventional bill depositing and drawing system, contents of bills the storing safes are often made unclear when the cash drawing operation becomes abnormal. In order to again make the operation of the apparatus normal, the operator in charge must return all of those bills which are on the way of their being paid in the machine into the storing safes. Therefore, a long time is needed to repair the apparatus and actual contents of bills are often made unequal to contents of bills in the apparatus by errors in the repairing process.

In the case of the conventional system, plural bills are accidentally taken out from one storing safe and they are distributed and accumulated, as bills rejected, in the rejected bill safe. The number of the bills rejected cannot be often specified and the number of the bills accumulated in the rejected bills safe and contents of bills in the storing safes are made unclear accordingly. The rejected bills safe must have therefore a sufficient bills containing capacity (or a capacity for containing a sufficient number of bills therein) and the number of bills notes to be paid must be kept high enough.

In order to eliminate the above-mentioned drawbacks, our inventors have completed a novel invention in which separator cards are used to carry out the careful examination.

According to the bill depositing and drawing system of the circulation type in which separator cards are used, bills are only once circulated between the storing safes and the careful examination section when the careful examination relative to bills is carried out. The time needed to carry out the careful examination can be thus made shorter and the possibility of damaging the bills can be reduced.

Further, the auxiliary storing safes are made unnecessary and only the bills storing safes are used to carry out the careful examination process. This enables the whole of the machine to be smaller-sized.

Furthermore, contents of bills in the apparatus can be confirmed even when the cash drawing operation becomes abnormal and the person in charge makes mistakes in operating the apparatus.

Still further, the number of bills accumulated in the rejected bills safe and contents of bills in the machine can be confirmed even when any of the drawing bills are rejected. Therefore, bills stored in the storing safes can be more efficiently drawn or paid and a larger number of bills can be accumulated in the rejected bills safe, as compared with the conventional cases.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A bill depositing and withdrawing system of the circulating type for receiving bills deposited and withdrawing them as money to be paid, comprising:
storing means for storing bills deposited;
memory means for memorizing number of the bills stored in the storing means;
take-out means for taking out the bills which are to be paid one by one from said storing means;
detecting means for detecting whether or not the bills taken out by the take-out means are correct;
withdrawal means for withdrawing the bills which have been detected correct by the detecting means;
collector means for collecting the bills which have been found incorrect by the detecting means;
causing means for causing a confirmating operation for confirmation of the number of bills stored in the storing means;
returning means for returning the bills which have been taken out from the storing mean by the take-out means and detected correct by the detecting means to the storing means during the confirmation operation caused by the causing means;
first counting means for counting the number of the bills which have been returned to the storing means by the returning means on the basis of results by the detecting means during the confirmation operation caused by the causing means; and
calculating means for calculating number of the bills which have been collected by the collector means by substracting the number of the bills counted by the first counting means from the number of the bills stored in the memory means.

2. The system according to claim 1, further comprising:
depositing means for depositing in the storing means the bills which have been collected by the collector means;
second counter means for counting number of bills deposited by said depositing means; and
means for adding a value obtained by said second counter means to that obtained by said first counter means, and causing the result thus obtained to be memorized in the memory means.

3. The system according to claim 1, wherein said storing means includes a bill storing portion in each of which bills are accumulated and said take-out means is provided at one end of the bill storing portion.

4. The system according to claim 3, wherein said returning means includes carriage means communicated respectively with said one end and an other end of the bill storing portion, and the bill storing portion is arranged to receive through said other end thereof the bills which have been taken out through said one end thereof by the take-out means.

5. The system according to claim 1, further comprising:

card supplying means for supplying a separator card to the bill storing sections; and means for stopping the take-out means when the separator card taken out from the bills storing sections by the take-out means is detected by the detecting means.

6. A bill depositing and withdrawing system of the circulation type for receiving bills deposited and withdrawing them as money to be paid, comprising:

storing means for storing bills deposited;

means for causing a confirming operation for confirming of the number of the bills stored in the storing means;

card supplying means for supplying a separator card to the storing means when said confirming operation is caused by the causing means;

memory means for memorizing the number of the bills stored in the storing means;

take-out means for taking out the bill to be paid and separator cards one by one from the storing means.

counting means for counting number of the bills taken out by the take-out means;

returning means for returning the bills counted by the counter means to the storing means;

detector means for detecting the separator card taken out by the take-out means; and stopping means for stopping the operation of said take-out means, said counter means and said returning means when the separator card is detected by said detector means.

7. A bill depositing and withdrawing system of the circulation type for receiving bills deposited and withdrawing them as money to be paid, comprising:

storing means for storing bills deposited;

card supplying means for supplying a separator card to the storing means at a predetermined time of the depositions thereafter, said separator card separating the bills and intervening in said bills;

memory means for memorizing, by the unit, the number of the bills separated by said separator card in said storing means;

take-out means for taking out the bills to be withdrawed and said separator card one by one from the storing means;

withdrawal means for withdrawing the bills be taken out by the take-out means;

causing means for causing a confirming operation for confirmation of the number of bills stored in the storing means;

counter means for counting number of the bills be taken out by the take-out mean during the confirming operation caused by the causing means;

returning means for returning the bills counted by the counter means to the storing means;

detector means for detecting the separator card be taken out by the take-out means;

stopping means for stopping said take-out means, said counter means and said returning means when the separator card is detected by the detector means; and calculating means for calculating a certain number of bills stored in the storing means on the basis of the number of the bills separated by the counted by the counter means and a certain number of bills separator card detected by the detector means stored in the memory means.

8. The system according to claim 7, wherein the detector means includes a means to detect whether or not bills are correct.

9. The system according to claim 8, further including an accumulating section for accumulating the bills which have been found incorrect by the finder means.

10. The system according to claim 7, wherein the instructor means is a teller machine which can be operated by a customer.

11. The system according to claim 7, further including a second counter means for counting bills deposited, on the basis of the result thus obtained by the first counter means, number of the bills between one separator card and next separator card being stored in the storing means.

* * * * *